US012774622B2

(12) United States Patent
Peynot et al.

(10) Patent No.: US 12,774,622 B2
(45) Date of Patent: Oct. 27, 2026

(54) VEHICLE DOOR HANDLE ASSEMBLY WITH A SHOCK ABSORBER

(71) Applicant: MINEBEA ACCESSSOLUTIONS ITALIA S.P.A., Pianezza (IT)

(72) Inventors: Thomas Peynot, Pianezza (IT); Frédéric Citron, Pianezza (IT)

(73) Assignee: MINEBEA ACCESSOLUTIONS ITALIA S.P.A., Pianezza (IT)

( * ) Notice: Subject to any disclaimer, the term of this patent is extended or adjusted under 35 U.S.C. 154(b) by 167 days.

(21) Appl. No.: 18/486,530

(22) Filed: Oct. 13, 2023

(65) Prior Publication Data

US 2024/0125155 A1 Apr. 18, 2024

(30) Foreign Application Priority Data

Oct. 14, 2022 (EP) .................................... 22201559

(51) Int. Cl.
*E05B 85/10* (2014.01)
*E05B 85/16* (2014.01)

(52) U.S. Cl.
CPC ............ *E05B 85/107* (2013.01); *E05B 85/16* (2013.01)

(58) Field of Classification Search
CPC ...... E05B 85/10; E05B 85/103; E05B 85/107; Y10S 292/31; Y10T 292/0824
See application file for complete search history.

(56) References Cited

U.S. PATENT DOCUMENTS 2,541,179 A * 2/1951 Sponsler ................... E05F 5/02 292/73
4,475,754 A * 10/1984 Arlauskas ............... E05B 85/16 292/336.3
5,039,145 A * 8/1991 Frye ........................ E05B 85/12 292/DIG. 59
5,152,030 A * 10/1992 Cogo .................... E05C 17/206 16/DIG. 21

(Continued)

FOREIGN PATENT DOCUMENTS

CN 111877892 A * 11/2020 ........... E05B 85/103
CN 112780134 A * 5/2021 ........... E05B 85/103

(Continued)

OTHER PUBLICATIONS

European Search Report issued in corresponding EP Application 22201559, dated Mar. 29, 2023, 3 pages.

*Primary Examiner* — Carlos Lugo
(74) *Attorney, Agent, or Firm* — BURRIS LAW, PLLC

(57) ABSTRACT

A vehicle door handle assembly includes a bracket and a handle. The handle includes a first extremity and a second extremity. The first extremity is configured to move between a rest position, a deployed position outside the bracket, and an opening position to open a latch. The second extremity is configured to move between a rest position, an activation position, and a deployed position outside the bracket. The bracket includes a shock absorber provided in or attached to a rest portion of the bracket. The shock absorber is configured to cooperate with the handle when the second extremity is moved from the rest position to the activation position and when the first extremity and the second extremity are moved together from the deployed position to the rest position.

10 Claims, 6 Drawing Sheets

(56) References Cited

U.S. PATENT DOCUMENTS

| | | | | |
|---|---|---|---|---|
| 6,901,630 | B2 * | 6/2005 | Liang | E05C 17/203<br>16/86 B |
| 9,372,001 | B2 * | 6/2016 | Gayle | F24C 15/022 |
| 10,550,611 | B2 * | 2/2020 | Och | E05B 85/107 |
| 11,391,073 | B2 * | 7/2022 | Rhein | E05B 81/90 |
| 11,746,575 | B2 * | 9/2023 | Cervone | E05B 85/16<br>292/336.3 |
| 12,196,016 | B2 * | 1/2025 | Guerin | E05B 81/76 |
| 2019/0283555 | A1 | 9/2019 | Couto Maquieira et al. | |
| 2020/0392771 | A1 | 12/2020 | Toyama | |

FOREIGN PATENT DOCUMENTS

| | | | | | |
|---|---|---|---|---|---|
| DE | 102021209082 | A1 | * | 11/2022 | |
| EP | 3071771 | B1 | * | 1/2018 | E05B 81/06 |
| EP | 3763904 | | * | 1/2021 | |
| KR | 20070031496 | A | * | 3/2007 | |
| KR | 20210055107 | A | * | 5/2021 | |
| WO | 2022138301 | A1 | | 6/2022 | |

* cited by examiner

VEHICLE DOOR HANDLE ASSEMBLY WITH A SHOCK ABSORBER

CROSS-REFERENCE TO RELATED APPLICATIONS

This application claims priority to and the benefit of EP 22201559.6 filed on Oct. 14, 2022. The disclosure of the above application is incorporated herein by reference.

FIELD

The present disclosure relates to a vehicle door assembly with a handle configured to translate between a rest position, where the handle is retracted, and a deployed position, where the handle is deployed and can be taken in hand and opened.

BACKGROUND

The statements in this section merely provide background information related to the present disclosure and may not constitute prior art.

Vehicle door handle assemblies with a handle translating between a rest position and a deployed position are becoming more common and requested by manufacturers. To translate between these two positions, the vehicle door handle assemblies can be motorized by an electric actuator or can be mechanically actuated by a manipulation from the user. The handles translate between several positions and are subjected to mechanical constraints that could lead to rough or noisy displacements.

the teachings of the present disclosure over these and other issues with typical handles and provide smoother movements of the handle and improve the user experience over typical handles.

SUMMARY

This section provides a general summary of the disclosure and is not a comprehensive disclosure of its full scope or all of its features.

The disclosure relates to a vehicle door handle assembly including a bracket and a handle, wherein the handle includes a first extremity and a second extremity opposed to the first extremity. The first extremity is configured to move between a rest position, a deployed position outside the bracket, and an opening position to open a latch of the vehicle door. The second extremity is configured to move between a rest position, an activation position where the second extremity is lowered into the bracket, and a deployed position outside the bracket.

The vehicle door handle assembly further includes a deployment element for bringing both the first extremity and the second extremity into the deployed position once the activation position of the second extremity is reached. The vehicle door handle assembly also includes at least one elastic element for passively bringing back both the first extremity and the second extremity to the rest position, wherein the bracket includes a shock absorber provided in or attached to a rest portion of the bracket. The shock absorber is configured to cooperate with the handle when the second extremity is moved from the rest position to the activation position and when the first extremity and the second extremity are moved together from the deployed position to the rest position.

The vehicle door handle assembly includes a handle that is not accessible to the user in the rest position. In one form, the handle may be moved to the deployed position so that the user can turn the handle to move the first extremity to the opening position. The movements of the handle are facilitated by the deployment element and the at least one elastic element. The shock absorber reduces the friction between the handle and the bracket during the movements of the handle, when moving the handle to the activation position, and when the handle is moved back from the deployed position to the rest position. The shock absorber has a dual purpose to smoothen the movement towards the activation position and to provide a soft stop for the handle when the handle returns to the rest position which reduces frictions and potential excess noise during fast returns.

According to an aspect of the disclosure, the handle includes an internal side facing the rest portion of the bracket in the deployed position, the internal side being configured to cooperate with the rest portion at least when the second extremity is moving from the rest position toward the activation position. The shock absorber protrudes from the rest portion. When the second extremity is moving from the rest position to the activation position, the internal side abuts the shock absorber which is protruding from the rest portion. When reaching the activation position, the internal side may be in contact with both the shock absorber and the rest portion. There is therefore minimal friction and noise between the rest portion and the internal side as the shock absorber permits a soft stop of the handle.

According to an aspect of the disclosure, the shock absorber includes a fixing part configured to be mounted on a receiving part of the rest portion and a damping part configured to cooperate with the handle. The shock absorber is constituted of two materials: one material is rigid and serves as a fixing means and the other material has a damping function. According to an aspect of the disclosure, the damping part is made of a resilient material, which permits the shock absorber to be deformable and to absorb the constraints applied by the internal side of the handle.

According to an aspect of the disclosure, the resilient material is rubber. The axle is made of a more rigid material compared to the damping part, for example, plastic, in one form.

According to an aspect of the disclosure, the fixing part is an axle provided with two ends configured to cooperate with corresponding bearings of the rest portion.

As the shock absorber is able to rotate, the shock absorber reduces frictions by cooperating with the internal side of the handle.

According to an aspect of the disclosure, the bearings are cavities made within the rest portion and configured to receive the two ends, the cavities are configured for removably clipping the two ends. This way, the two extremities are removably fixed to the rest portion. The shock absorber can be removed and changed if desired.

According to an aspect of the disclosure, the rest portion presents an angled fraction joining two transverse fractions of the rest portion, the shock absorber is provided in or attached to the angled fraction of the rest portion.

The following paragraphs concern an activation by rotation alternative wherein the user pushes on the second extremity to rotate the handle toward the activation position.

According to an aspect of the disclosure, the second extremity of the handle is configured to be pushed into the bracket for being displaced from the rest position to the activation position. The internal side is configured to rotate, supporting the shock absorber when moving from the rest position to the activation position.

In one form, the shock absorber is rotating around the axle when moving the second extremity from the rest position to the activation position. The rotation of the handle does not cause friction as the internal side of the handle cooperates with the rotating shock absorber.

According to an aspect of the disclosure, the handle and the axle are rotating according to a parallel axis.

According to an aspect of the disclosure, the internal side of the handle rests on the rest portion of the bracket when the first extremity and the second extremity are both in the rest position with the internal side of the handle also resting on the shock absorber.

When moving from the deployed position to the rest position, due to the at least one elastic elements, the handle first touches the shock absorber that is deformed so that the internal side of the handle gently abuts the rest portion.

The following paragraphs concern an activation by translation alternative wherein the user may push anywhere on the handle to translate the handle within the bracket toward the activation position.

According to an aspect of the disclosure, the handle is configured to be pushed in a rectilinear manner into the bracket, both the first extremity and the second extremity moving together from the rest position to the activation position.

In one form, the shock absorber is squeezed when pushing the handle in a rectilinear manner into the bracket.

According to one form, where the activation is realized by pushing the handle in a rectilinear manner, the shock absorber does not rotate but gives a resistance till the activation position is reached.

According to an aspect of the disclosure, the handle is configured to abut the rest portion of the bracket in the activation position, the handle being distant from the rest portion when the first extremity and the second extremity are both in the rest position.

A mechanism for moving the handle is described below.

The first extremity may be connected to a first lever of the vehicle door handle assembly, the first lever is designed to be connected to an opening lever to open a latch of the vehicle door. The first lever is designed to rotate between a rest position where the first extremity of the handle is in a rest position, a deployed position where the first extremity of the handle is in a deployed position outside the bracket, and an opening position where the first lever actuates the opening lever.

The second extremity may be connected to a second lever of the vehicle door handle assembly, the second lever is designed to rotate between a rest position where the second extremity of the handle is a rest position, an activation position where the second extremity of the handle lowers the second lever into the bracket, and a deployed position where the second extremity of the handle is in a deployed position outside the bracket.

The vehicle door handle assembly may include a return lever having a first extremity connected to the second lever, the return lever being designed to rotate between a first position and a second position. The return lever including an elastic element from the at least one elastic element passively bringing back the return lever to its first position.

The rotation of the second lever to its activation position may actuate the rotation of the return lever from a first position to a second position, and the passive rotation of the return lever from the second position to the first position actuates the rotation of the second lever from its deployed position to its rest position.

The return lever may be connected to a delay element which slows down the passive rotation of the return lever from the second position to the first position. The delay element may include at least one damper. The at least one damper may include a gearwheel and the extremity of the return lever connected to the at least one damper may include an arc portion with teeth engaged with the gearwheel. The extremity of the return lever connected to the at least one damper may include a portion without teeth in order to disconnect the return lever of the at least one damper before the return lever reaches its first position.

The first lever may include an elastic element from the at least one elastic element passively bringing back the first lever from its deployed position to its rest position. The second lever may include an additional elastic element passively rotating the second lever toward its deployed position.

The connection between the first lever and the first extremity of the handle may be a pivot-slide connection.

The first and second levers are connected with at least one first rod the first rod transmitting the rotation of the second lever from the activation position to the deployed position to the first lever, and rotating the first lever from the rest position to the deployed position.

The deployment element includes the first lever, the second lever and the at least one first rod.

The first rod may include a pivot-slide connection with either the first or second levers so that the first lever can rotate from the rest position to the deployed position or from the deployed position to the opening position without rotating the second lever.

The second and the return levers may be connected by a second rod and a third rod, the second rod transmitting the rotation of the second lever from the rest position to the activation position to the return lever, and rotating the return lever from the first position to the second position, the third rod transmitting the rotation of the return lever from its second position to its first position to the second lever, rotating the second lever from its deployed position to its rest position.

The second rod may include a pivot-slide connection with either the second or return lever.

The third rod includes a pivot-slide connection with either the second or return lever.

The handle may be configured to be pushed into the bracket for lowering the second lever to the activation position. The handle may be configured to move in a rectilinear manner when pushing the handle into the bracket.

Here, the handle is considered as a whole to be pushed by the user into the bracket. There is no rotation of the handle when a user is pushing on the handle, in this form.

The handle may be configured to abut a rest portion of the bracket in the activation position, the handle is distant from the rest portion when the first lever and second lever are both in the rest position. In other words, there is an activation clearance within the bracket so that the handle can be moved in a rectilinear manner from its rest position to the activation position.

The handle may present an external side facing the outside of the bracket; any part of the external side is configured to be pushed towards the bracket for lowering the second lever to the activation position.

The handle may include a leg linking the first extremity and the second extremity. The leg, the first extremity and the second extremity are each presenting a corresponding portion of the external side.

The external side may present a contour corresponding to a contour on an opening of the bracket that receives the handle. In one form, both contours merge in rest position of the first lever and second lever.

Alternatively, the second extremity of the handle may be configured to be pushed into the bracket for lowering the second lever to the activation position. In one alternative, the user activates the handle by pushing the second extremity of the handle into the bracket.

In one form, the handle may be configured to rotate taking support from a rest portion of the bracket. The first extremity of the handle protrudes from the bracket and rotates the first lever around a pivot connection with the bracket from the rest position to an intermediate position.

Here, there is no activation clearance and the handle as a whole cannot translate in a rectilinear manner within the bracket. Instead, there is a rotation of the handle taking support from the rest portion. Thus, in one form, the user may push on the second extremity to rotate the handle for moving the second lever to the activation position.

The rest portion is placed between the first and second extremities of the handle. The rotation of the first lever is not transmitted to the second lever by the first rod due to the pivot-slide connection of the first rod with either the first or second levers.

In one form, when the first lever and the second lever are both in the rest position, the internal side of the handle rests on the rest portion of the bracket. Here, the geometry of the rest portion is similar but there is no activation clearance.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
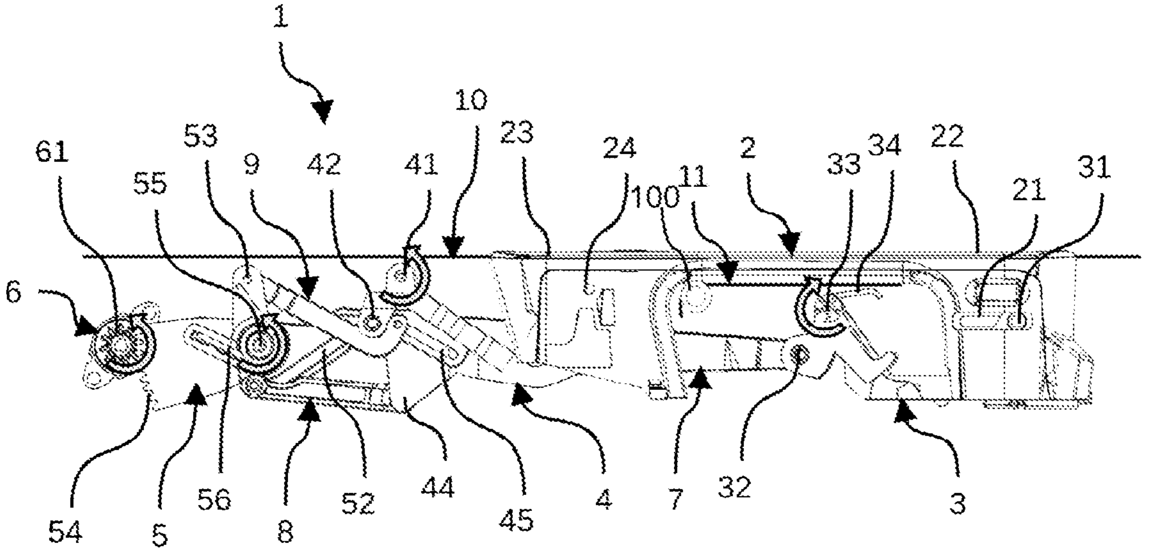
FIG. 1 is a top view of a schematic representation of a first side of a vehicle door assembly in a rest position according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Handle and Mechanism for Moving the Handle

Figure 2:
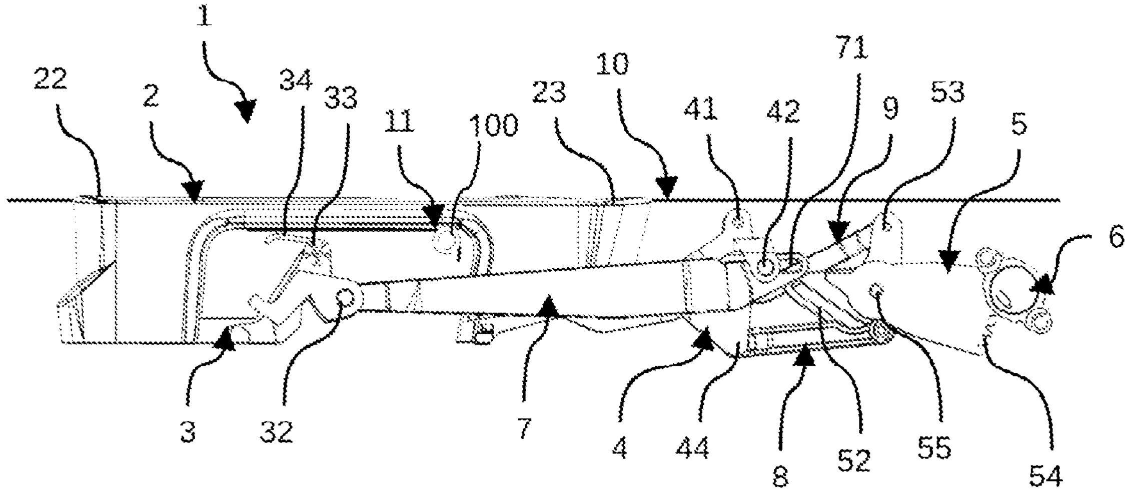
FIG. 2 is a bottom view of a schematic representation of a second side of a vehicle door assembly in a rest position according to one form of the present disclosure.

FIGS. 1 and 2 show a vehicle door handle assembly 1 in a rest position. The vehicle door handle assembly 1 includes a bracket 10 and a handle 2. The bracket 10 is designed to be fixed on the vehicle door (not represented). In the rest position, the handle 2 is retracted into the bracket 10 in order to be at the same level as the door body when installed.

The handle 2 includes a first extremity 22 and a second extremity 23 opposed to the first extremity 22. The first extremity 22 of the handle 2 is connected to a first lever 3 and the second extremity 23 of the handle 2 is connected to a second lever 4.

The first lever 3 is also designed to be connected to an opening lever (not represented) to open a latch of the vehicle door. The first lever 3 is designed to rotate between a rest position (represented in FIGS. 1 and 2) where the first extremity 22 of the handle 2 is in a rest position, a deployed position (represented in FIGS. 3 to 6) where the first extremity 22 of the handle 2 is in a deployed position outside the bracket 10 and an opening position (represented in FIGS. 7 and 8) where the first lever 3 actuates the opening lever.

More precisely, the first lever 3 includes a pivot connection 33 with the bracket 10 around which the first lever 3 rotates between the first lever's 3 different positions. A first extremity of the first lever 3 is connected to the first extremity 22 of the handle 2 and a second extremity of the first lever 3, is connected to the opening lever. Due to a pivot connection 33 and the shape of the first lever 3, the first lever 3 may touch the opening lever during the movement.

The connection between the first lever 3 and the first extremity 22 of the handle is, in one form, a pivot-slide connection. In the examples represented FIGS. 1, 3, 5, and 7, the first extremity 22 of the handle 2 includes a slide opening 21 and the first lever 3 includes a recess 31, for example, to receive a pin (not represented). The first lever 3 may also include an elastic element 34 passively bringing back the first lever 3 from the first lever's 3 deployed position to the first lever's 3 rest position. This elastic element 34 may be a spring positioned, for example, on the pivot connection 33 between the first lever 3 and the bracket 10. The torque applied by this elastic element 34 is represented by a grey arrow in FIGS. 1 to 8.

The second extremity 23 of the handle 2 is connected to a second lever 4. The second lever 4 is designed to rotate between a rest position (represented in FIGS. 1 and 2) where the second extremity 23 of the handle 2 is in a rest position, an activation position (represented in FIGS. 3 and 4 and 10 according to an alternative) where the second extremity 23 of the handle 2 lowers the second lever 4 into the bracket 10, and a deployed position (represented in FIGS. 5 to 8) where the second extremity 23 of the handle 2 is in a deployed position outside the bracket 10.

More precisely, the second lever 4 includes a pivot connection 41 with the bracket 10 around which the second lever 4 rotates between the different positions. A first extremity of the second lever 4 is connected to the second extremity 23 of the handle 2. The connection is, in one form, a pivot connection 24. The second lever 4 may also include an additional elastic element (not represented) passively rotating the second lever 4 to the second lever's 4 deployed position. This additional elastic element may be a spring positioned, for example, on the pivot connection 41 between the second lever 4 and the bracket 10. The torque applied by the additional elastic element is represented by a grey arrow in FIGS. 1 to 8.

The first lever 3 and second lever 4 may be connected together with at least one first rod 7 in order to synchronize the movements of the two levers 3, 4. The first rod 7 transmits the rotation of the second lever 4 from the second lever's 4 activation position to the second lever's 4 deployed position to the first lever 3, rotating the first lever 3 from the first lever's 3 rest position to the first lever's 3 deployed position. The first rod 7 may include a pivot-slide connection with either the first lever 3 or second lever 4 so that the first lever 3 can rotate from its rest position to its deployed position or from its deployed position to its opening position without rotating the second lever 4. In the example illustrated in FIGS. 1 to 8, the first rod 7 includes a first extremity connected to a second extremity of the first lever 3 by a pivot connection 32. The first rod 7 includes a second extremity connected to the second lever 4 by pivot-slide connection. The second extremity of the first rod 7 includes a slide 71 and the second extremity of the second lever 4 includes a pin 42 inserted into the slide 71. The handle 2, the first lever 3, the second lever 4 and the first rod 7 are designed and connected like a parallelogram and move together synchronously. The other connection of the first rod 7 with either the first 3 or second lever 4 is, in one form, a pivot connection.

The vehicle door handle assembly 1 also includes a return lever 5 having a first extremity connected to a second extremity of the second lever 4, the return lever 5 being designed to rotate between a first position (represented in FIGS. 1 and 2) and a second position (represented in FIGS. 3 to 8). More precisely, the return lever 5 includes a pivot connection 55 with the bracket 10 around which the return lever 5 rotates between its different positions. The return lever 5 also includes an elastic element 56 passively bringing back the return lever 5 to its first position. This elastic element 56 may be a spring positioned for example on the pivot connection 55 between the return lever 5 and the bracket 10. The torque applied by this elastic element 56 is represented by a grey arrow on FIGS. 1 to 8.

The rotation of the second lever 4 to the second lever's 4 activation position actuates the rotation of the return lever 5 from the return lever's 5 first to the return lever's 5 second position. The passive rotation of the return lever 5 from the return lever's 5 second to the return lever's 5 first position actuates the rotation of the second lever 4 from the second lever's deployed position to the second lever's rest position.

The second lever 4 and the return lever 5 are connected by a second rod 8 and a third rod 9. The second rod 8 transmits the rotation of the second lever 4 from the second lever's 4 rest position to the second lever's 4 activation position to the return lever 5, rotating the return lever 5 from the return lever's 5 first position to the return lever's 5 second position. The third rod 9 transmits the rotation of the return lever 5 from the return lever's 5 second position to the return lever's 5 first position to the second lever 4, rotating the second lever 4 from the second lever's 4 deployed position to the second lever's 4 rest position. The second rod 8 and the third rod 9 are placed on the return lever 5 on either side of the pivot connection 55 of the return lever 5 with the bracket 10. The second rod 8 and the third rod 9 are placed on the second extremity of second lever 5 on the same side of the pivot connection 41 of the second lever 4 with the bracket 10.

The second rod 8 may include a pivot-slide connection 52 with either the second lever 4 or return lever 5. In the example illustrated in FIGS. 1 to 8, the pivot-slide connection 52 is placed between the return lever 5 and the second rod 8. The return lever 5 includes the slide of the pivot-slide connection 52 and the second rod 8 includes a pin inserted in the slide. Still according to the example illustrated in FIGS. 1 to 8, the connection between the second rod 8 and the second lever 4 is a pivot connection 44. The other connection of the second rod 8 with any of the second lever 4 or return lever 5 is, in one form, a pivot connection.

The third rod 9 may include a pivot-slide connection 45 with any of the second lever 4 or return lever 5. In the example illustrated in FIGS. 1 to 8, the pivot-slide connection 45 is placed between the second lever 4 and the third rod 9. The second lever 4 includes the slide of the pivot-slide connection 45 and the third rod 9 includes a pin inserted in the slide. Still according to the example illustrated in FIGS. 1 to 8, the connection between the third rod 9 and the return lever 5 is a pivot connection 53. The other connection of the third rod 9 with any of the second lever 4 or return lever 5 is, in one form, a pivot connection.

The return lever 5, in one form, the return lever's 5 second extremity, is connected to a delay element 6 which slows down the passive rotation of the return lever 5 from the return lever's 5 second position to the return lever's 5 first position. This delay element 6 may include at least one damper as illustrated in FIGS. 1 to 8. The at least one damper 6 may include a gearwheel 61 and the extremity of the return lever 5, connected to the at least one damper 6, include an arc portion with teeth 54 engaged with the gearwheel 61. The torque applied by the at least one damper 6 is represented by a grey arrow on FIGS. 1 to 8.

The FIGS. 1 to 8 represent different positions and cinematic steps of the deployment, opening and retraction of the handle 2.

As described above, FIGS. 1 and 2 are a representation of a rest position where the handle 2 is retracted into the bracket 10 in order to be at the same level of the door body when installed. The first lever 3 is in the first lever's 3 rest position and maintained in the rest position by the elastic element 34. The second lever 4 is in the second lever's 4 rest position and the return lever 5 is in the return lever's 5 first position. The return lever 5 is maintained in the return lever's 5 first position by the elastic element 56. The elastic element 56 of the return lever 5 is stronger than the additional elastic element of the second lever 4 so that the return lever 5 in the return lever's 5 first position maintains the second lever 4 in the return lever's 5 rest position. The elastic element 56 of the return lever 5 is also stronger than the delay element 6 in order to maintain the return lever 5 in the return lever's 5 first position. In the rest position, the internal side 27 of the handle 2 may also rest on a rest portion 11 of the bracket 10 placed between the first extremity 22 and second extremity 23 of the handle 2.

Figure 3:
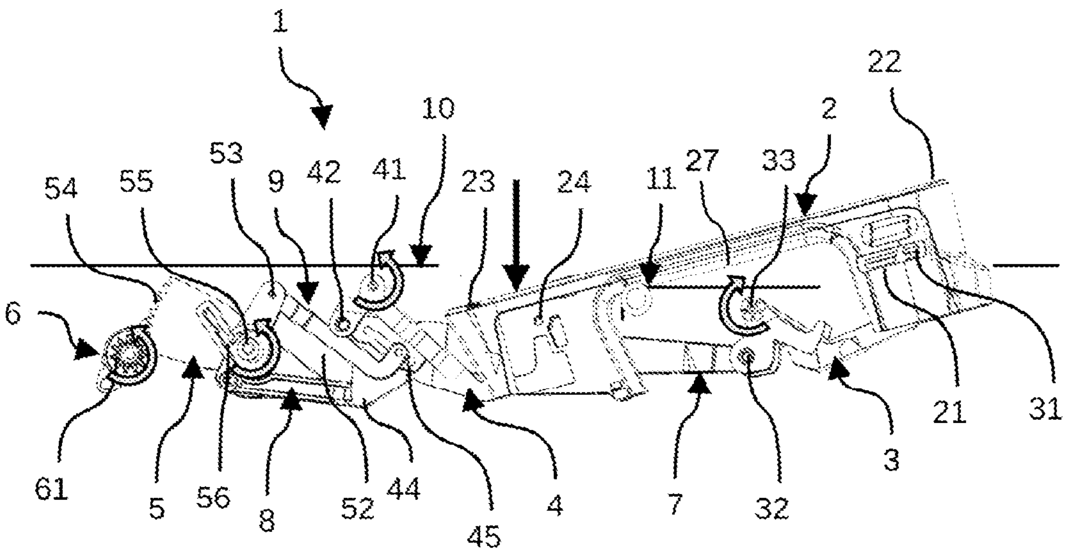
FIG. 3 is a top view of a schematic representation of a first side of a vehicle door assembly in an activation position according to an activation by rotation alternative according to one form of the present disclosure.
Figure 4:
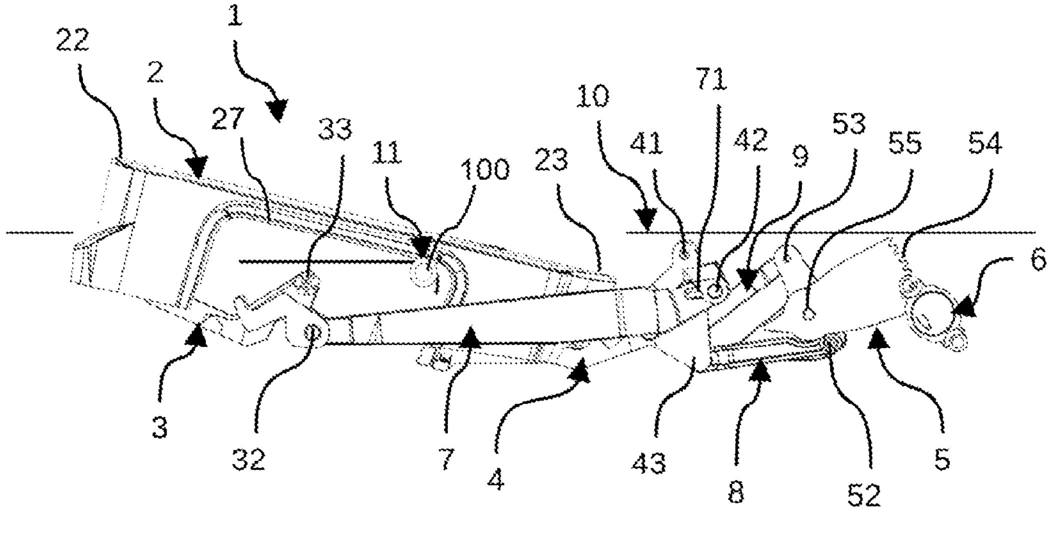
FIG. 4 is a bottom view of a schematic representation of a second side of a vehicle door assembly in an activation position according to the activation by rotation alternative according to one form of the present disclosure.

FIGS. 3 and 4 represent an activation position of the handle 2 according to an activation by rotation alternative where the user activates the handle 2 by pushing the second extremity 23 of the handle 2 into the bracket 10. Due to the push, the handle 2 rotates taking support on the rest portion 11 of the bracket 10. The first extremity 22 of the handle 2 protrudes from the bracket 10 and rotates the first lever 3 around the pivot connection 33 with the bracket 10 from the rest position to an intermediate. The rotation of the first lever 3 is not transmitted to the second lever 4 by the first rod 7 due to the pivot-slide connection of the first rod 7 with either the first 3 or second lever 4.

The push of the second extremity 23 of the handle 2 rotates the second lever 4 around the pivot connection 41 with the bracket 10 from the rest position to the activation position. The rotation of the second lever 4 causes the rotation of the return lever 5 around the pivot connection 55 with the bracket 10 from the first position to the second position. In the example illustrated in FIGS. 3 and 4, the transmission of the rotation of the second lever 4 to the return lever 5 is made by the second rod 8 which pushes one side of the return lever 5 causing the return lever's 5 rotation. Indeed, the rotation of the second lever 4 to the second lever's 4 activation position makes the second rod 8 slide in the second rod's 8 pivot-slide connection 52 with either the second lever 4 or return lever 5 bringing the second rod 8 to abutment and pushing the return lever 5. The third rod 9 slides in the third rod's 9 pivot-slide connection 45 with either the second lever 4 or the return lever 5 without affecting the rotation of either of these levers 4, 5. The rotation of the second lever 4 is made against the torque of the additional elastic element and the rotation of the return lever 5 is made against the torque of the elastic element 56.

Figure 10:
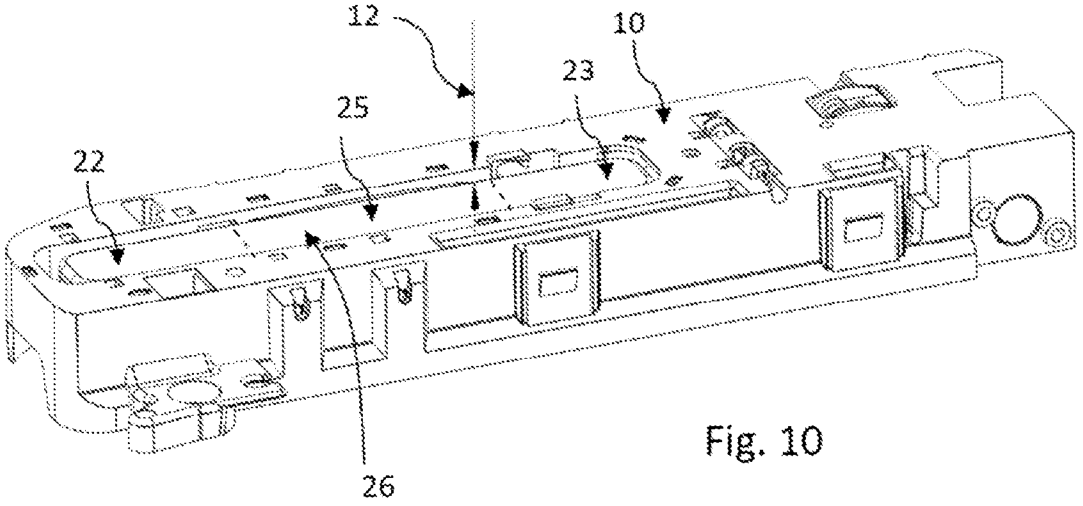
FIG. 10 is a perspective view of the vehicle door assembly on the activation position according to an activation by translation alternative according to one form of the present disclosure.

FIG. 10 presents an activation by translation alternative, wherein there is an activation clearance 12 within the bracket 10 so that the handle 2 can be moved in a rectilinear manner from the rest position to the activation position as depicted.

The handle 2 is pushed into the bracket for lowering the second lever 4 to the activation position.

Due to the presence of the activation clearance 12, the handle 2 moves in a rectilinear manner when pushing the handle into the bracket 10. Thus, the handle 2 is considered as a whole to be pushed by the user into the bracket. There is no rotation of the handle 2 when a user is pushing on the handle 2.

The handle 2 is configured to abut on the rest portion 11 of the bracket 10 in the activation position, the handle 2 being distant from the rest portion 11 when the first lever 3 and second lever 4 are both in rest position.

The handle 2 includes an external side 26 facing the outside of the bracket 10; any part of the external side 26 being configured to be pushed towards the bracket 10 for lowering the second lever 4 to the activation position.

The handle 2 includes a leg 25 linking the first extremity 22 and the second extremity 23. The leg 25, the first extremity 22, and the second extremity 23 each include a corresponding portion of the external side 26.

The external side 26 may present a contour corresponding to a contour on an opening of the bracket 10 that receives the handle. In one form, both contours merge in the rest position of the first lever and second lever. In other words, in the rest position, both contours are at a corresponding level transversally to an extension plan of the external side 26.

Both the alternatives with an activation by rotation and an activation by translation are compatible with the other constructional features herein described. Only the position of the rest portion 11 differs. The rest portion 11 is deeper within the bracket 10 according to the activation by translation alternative.

Figure 5:
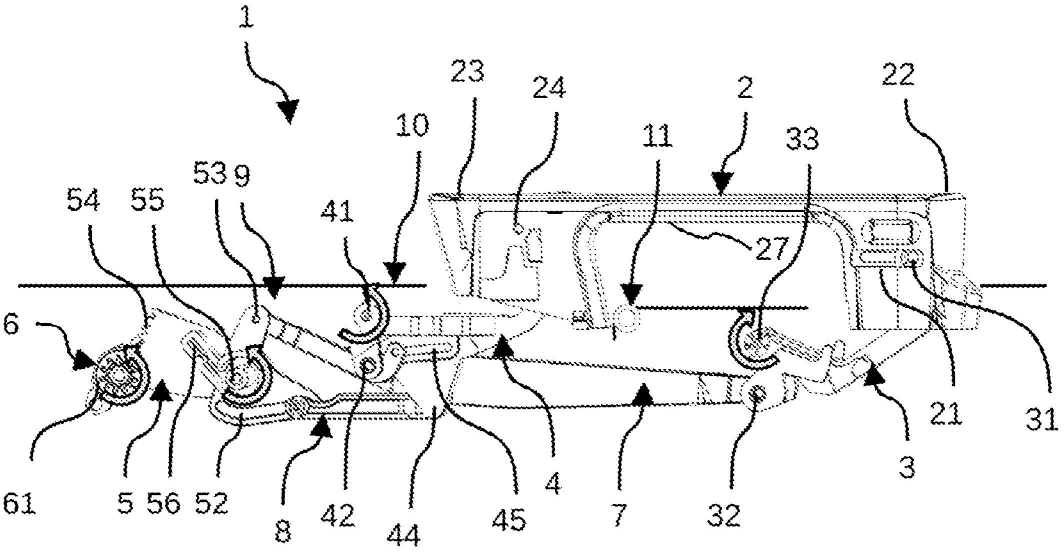
FIG. 5 is a top view of a schematic representation of a first side of a vehicle door assembly in a deployed position according to one form of the present disclosure.
Figure 6:
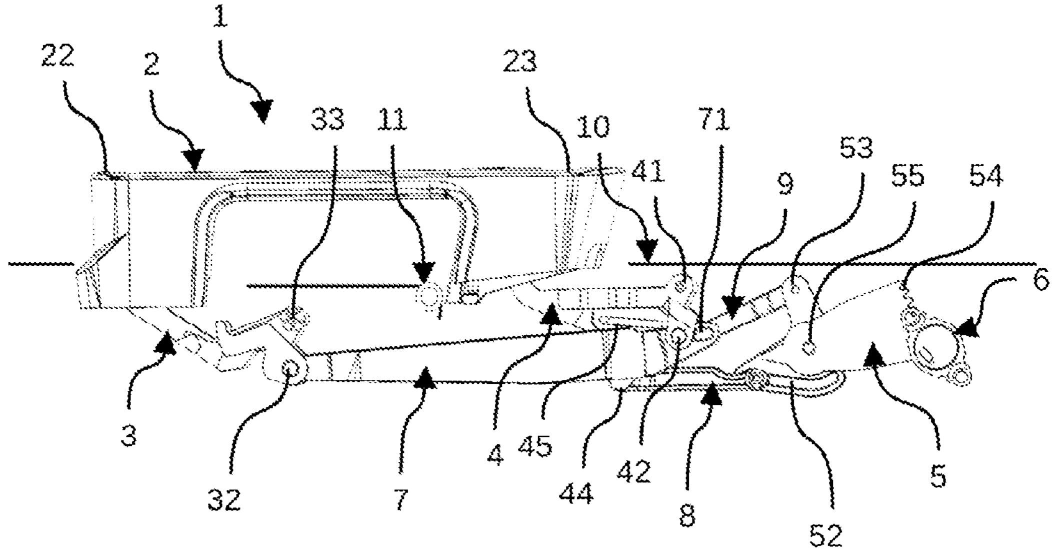
FIG. 6 is a bottom view of a schematic representation of a second side of a vehicle door assembly in a deployed position according to one form of the present disclosure.

FIGS. 5 and 6 represent a deployed position of the handle 2 where the first lever 3 is still in the first lever's 3 deployed position and where the second lever 4 has rotated from the second lever's 4 activation position to the second lever's 4 deployed position, bringing the second extremity 23 of the handle 2 in the deployed position outside the bracket 10. When the user removes pressure on the second extremity 23 of the handle 2, the additional elastic element of the second lever 4 allows the passive rotation of the second lever 4 to the second lever's 4 deployed position. The rotation of the second lever 4 is not transmitted to the return lever 5 by either the second rod 8 or the third rod 9 which slide with their pivot-slide connections 45, 52. The first lever 3 is maintained in the first lever's 3 deployed position due to the first rod 7 which is in abutment with the first rod's 7 pivot-slide connection. The return lever 5 is still on the second position due to the delay element 6. The third rod 9 is in abutment in order to stop the rotation of the second lever 4 in the deployed position against the torque of its elastic element 34.

Figure 7:
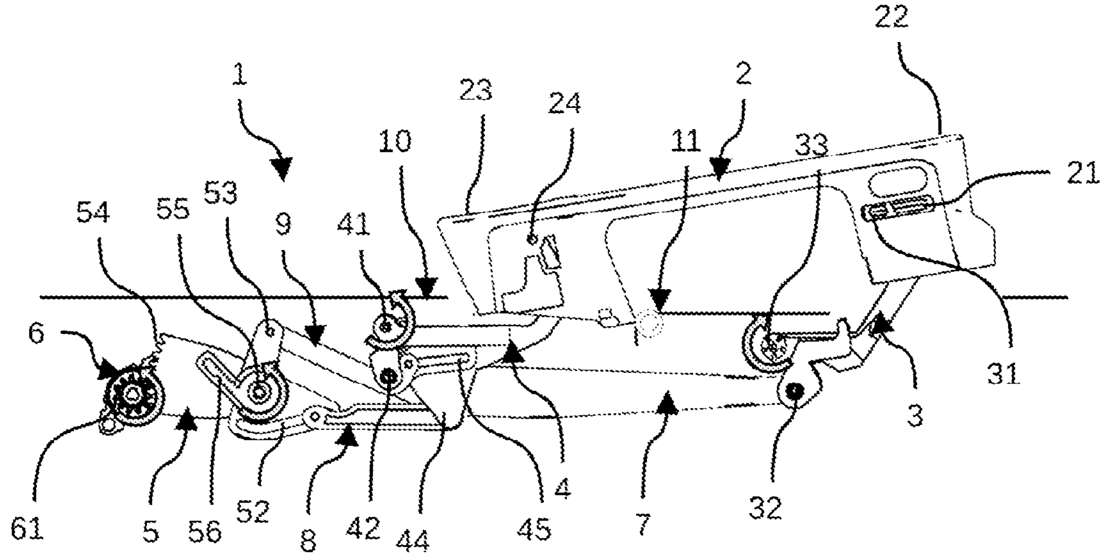
FIG. 7 is a top view of a schematic representation of a first side of a vehicle door assembly in an opening position according to one form of the present disclosure.
Figure 8:
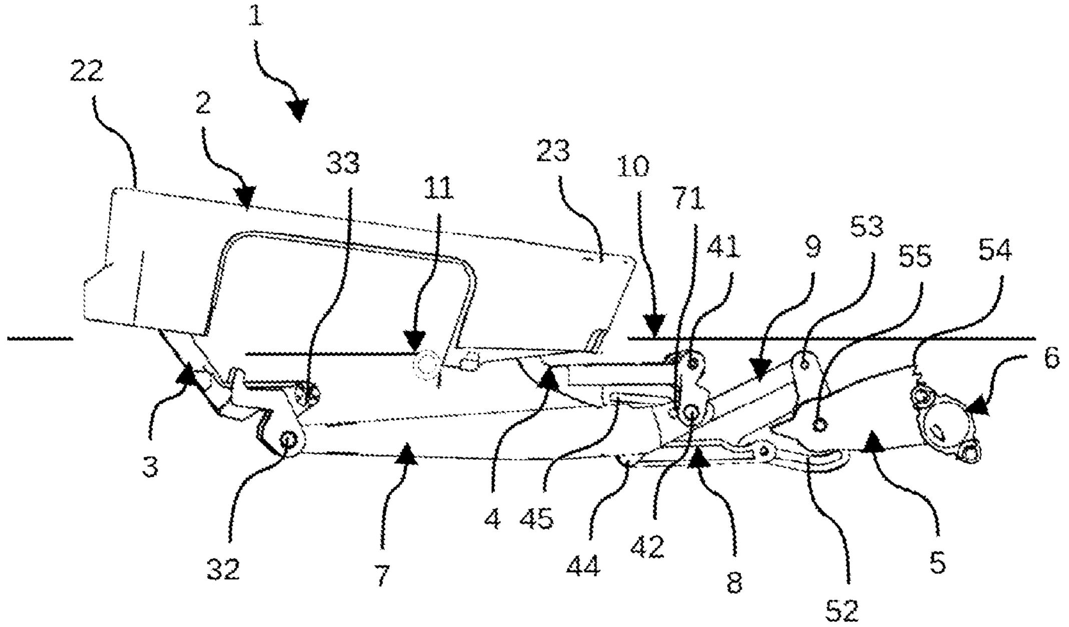
FIG. 8 is a bottom view of a schematic representation of a second side of a vehicle door assembly in an opening position according to one form of the present disclosure.

FIGS. 7 and 8 represent an opening position of the handle 2 where the user can grab the handle 2 and pull the handle 2 or has taken the handle 2 and pulled it to open the vehicle door. When the user pulls the handle 2, it rotates around the pivot connection 24 between the second extremity 23 of the handle 2 and the second lever 4. The first extremity 22 of the handle 2 is pulled in an opening position rotating the first lever 3 from the first lever's 3 deployed position to the first lever's 3 opening position. The rotation of the first lever 3 is not transmitted to the second lever 4 by the first rod 7 due to the first lever's 3 pivot-slide connection. When the user releases the handle 2, the first lever 3 rotates back to the first lever's 3 deployed position due to the elastic element 34.

The delay element 6 slows down the passive return rotation of the return lever 5 from the second position to the first position. When the return lever 5 rotates from the second to the first position, it also transmits the return lever's 5 rotation to the second lever 4 in order to rotate the second lever 4 from the deployed position to the rest position. In the example illustrated in FIGS. 7 and 8, when the return lever 5 rotates to the first position, the third rod 9 is in abutment in order to pull back the second lever 4 in the rest position against the torque of the additional elastic element 34 of the second lever 4. The rotation of the second lever 4 and the first lever 3 to their rest position are synchronous due to the first rod 7. Thus, the handle 2 translates from the handle's 2 deployed position (FIGS. 5 and 6) to the handle's 2 rest position (FIGS. 1 and 2). The translation is slowed down and progressive thanks to the delay element 6.

Figure 9:
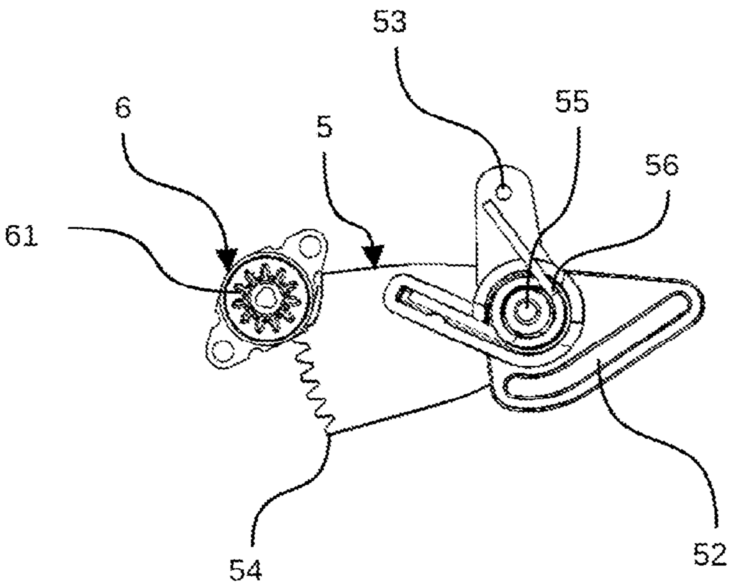
FIG. 9 is a schematic representation of a second lever according to one form of the present disclosure.

In one variation illustrated in FIG. 9, the extremity of the return lever 5 connected to the at least one damper 6 may include a portion without teeth 54 in order to disconnect the return lever 5 of the at least one damper 6 before the return lever 5 reaches the first position. One variation permits acceleration of the return of the return lever 5 at the end and so accelerates the translation of the handle 2 from the handle's 2 deployed position to the handle's 2 rest position when the handle 2 is near the handle's 2 rest position.

Shock Absorber Integrated in the Bracket

A vehicle door handle assembly 1 includes a bracket 10 and a handle 2, the handle 2 including a first extremity 22 and a second extremity 23 opposed to the first extremity 22.

The first extremity 22 is configured to move between a rest position, a deployed position outside the bracket 10 and an opening position to open a latch of the vehicle door.

The second extremity 23 is configured to move between a rest position, an activation position where the second extremity 23 is lowered into the bracket 10, and a deployed position outside the bracket 10.

The vehicle door handle assembly 1 includes a deployment element for bringing both the first extremity 22 and the second extremity 23 to the deployed position once the activation position of the second extremity 23 is reached.

The vehicle door handle assembly 1 also includes at least one elastic element 56, 34 for passively bringing back both the first extremity 22 and the second extremity 23 to the rest position.

Figure 11:
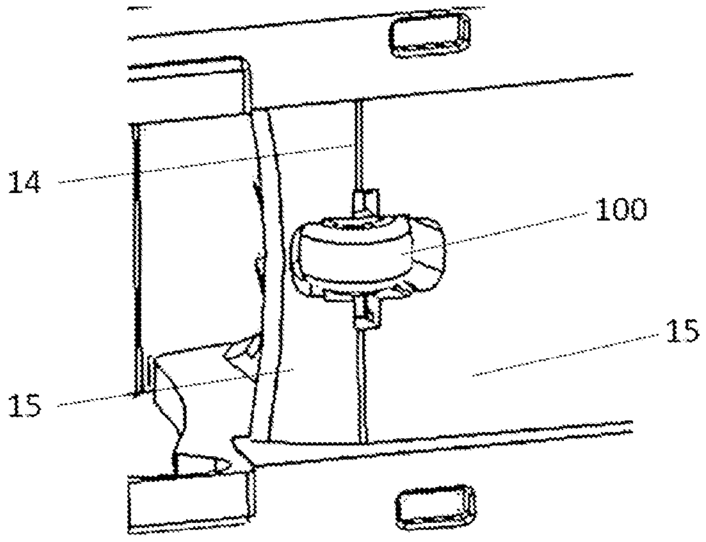
FIG. 11 is a perspective view of a rest part of the bracket and a shock absorber according to one form of the present disclosure.
Figure 12:
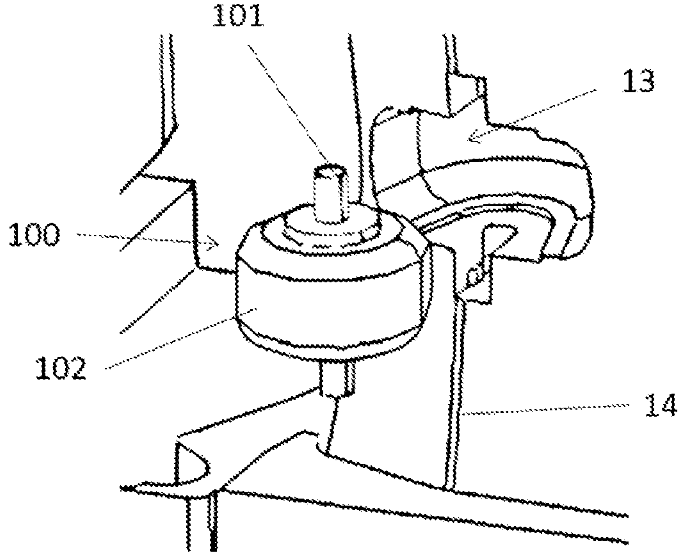
FIG. 12 is an exploded perspective view of the rest part and the shock absorber according to one form of the present disclosure.

As also illustrated in FIGS. 11 and 12, the bracket 10 includes a shock absorber 100 provided in or attached to a rest portion 11 of the bracket 10, the shock absorber 100 is configured to cooperate with the handle 2 when the second extremity 23 is moved from the rest position to the activation position and when the first extremity 22 and the second extremity 23 are moved together from the deployed position to the rest position.

The vehicle door handle assembly 1 includes a handle 2 that is not accessible to the user in the rest position. In one form, when the handle 2 is moved to the deployed position the user can turn the handle 2 to move the first extremity 22 to the opening position.

The deployment element includes the first lever 3, the second lever 4 and at least one first rod 7 described above.

The movements of the handle 2 are facilitated due to the deployment element and the at least one elastic element 56, 34. The shock absorber 100 reduces the friction between the handle 2 and the bracket 10 during the movements of the handle 2, in one form, when moving the handle 2 to the activation position and when the handle 2 is moved back from the deployed position to the rest position.

The shock absorber 100 has a dual purpose to smoothen the movement towards the activation position and to provide a soft stop for the handle 2 when it comes back in rest position to reduce frictions and potential noise present during a fast return.

The handle 2 includes an internal side 27 facing the rest portion 11 of the bracket 10 in the deployed position, the internal side 27 being configured to cooperate with the rest portion 11 at least when the second extremity 23 is moving from the rest position toward the activation position, the shock absorber 100 protruding from the rest portion.

When the second extremity 23 is moving from the rest position to the activation position, the internal side 27 abuts the shock absorber 100 which is protruding from the rest portion 11. When reaching the activation position, the internal side 27 can possibly be in contact with both the shock absorber 100 and the rest portion 11. There is, therefore, minimal friction or noise between the rest portion 11 and the internal side 27 as the shock absorber 100 permits a soft stop of the handle 2.

The shock absorber includes a fixing part 101 configured to be mounted on a receiving part 13 of the rest portion 11 and a damping part 102 configured to cooperate with the handle (2).

The shock absorber 100 is constituted of two materials: one material is rigid and serves as a fixing means and the other material has a damping function, which permits the shock absorber 100 to be deformable and to absorb the constraints applied by the internal side 27 of the handle 2. The damping part 102 is made of a resilient material. In one form, the resilient material is rubber. The fixing part 101 is an axle provided with two ends configured to cooperate with corresponding bearings of the rest portion 11. The axle is made in a more rigid material compared to the damping part 102, for example, plastic.

As the shock absorber is able to rotate, it reduces frictions by cooperating with the internal side of the handle.

The bearings are cavities made within the rest portion 11 and configured to receive the two ends, the cavities are configured for removably clipping the two ends.

The two extremities are removably fixed to the rest portion 11. The shock absorber 100 can be removed and changed if desired.

The rest portion 11 presents an angled fraction 14 joining two transverse fractions 15 of the rest portion 11, the shock absorber 100 being provided in or attached to the angled fraction 14 of the rest portion 11.

The following paragraphs concern an activation by rotation alternative wherein the user pushes on the second extremity to rotate the handle toward the activation position.

The second extremity 23 of the handle 2 is configured to be pushed into the bracket 10 when the handle 2 is displaced from the rest position to the activation position, the internal side 27 is configured to rotate taking support on the shock absorber 100 when moving from the rest position to the activation position.

The shock absorber 100 rotates around the axle when moving the second extremity 23 from the rest position to the activation position. The rotation of the handle 2 does not cause friction as the internal side 27 of the handle 2 cooperates with the rotating shock absorber 100. The handle 2 and the axle are rotating according to a parallel axis.

The internal side 27 of the handle 2 rests on the rest portion 11 of the bracket 10 when the first extremity 22 and the second extremity 23 are both in the rest position, the internal side 27 of the handle 2 also rests on the shock absorber 100.

When moving from the deployed position to the rest position due to the at least one elastic element 56, 34, the handle 2 first touches the shock absorber 100 that is deformed so that the internal side 27 of the handle 2 gently abuts on the rest portion 11.

The following paragraphs concern an activation by translation alternative wherein the user pushes anywhere on the handle 2 to translate the handle 2 within the bracket 10 toward the activation position.

The handle 2 is configured to be pushed in a rectilinear manner into the bracket 10, both the first extremity 22 and the second extremity 23 moving together from the rest position to the activation position.

The shock absorber 100 is squeezed when pushing the handle 2 in a rectilinear manner into the bracket 10.

According to one variation, the activation is realized by pushing the handle 2 in a rectilinear manner, the shock absorber 100 does not rotate but gives a resistance till the activation position is reached.

The handle 2 is configured to abut the rest portion 11 of the bracket 10 in the activation position, the handle 2 being distant from the rest portion 11 when the first extremity 22 and the second extremity 23 are both in the rest position.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle door handle assembly comprising:

a bracket including a rest portion;

a handle including a first extremity and a second extremity opposed to the first extremity, wherein the first extremity is configured to move between a rest position, a deployed position outside the bracket, and an opening position configured to open a latch of a vehicle door, wherein the second extremity is configured to move between a rest position, an activation position where the second extremity is lowered into the bracket, and a deployed position outside the bracket;

a deployment element configured to move both the first extremity and the second extremity to the deployed position upon the activation position of the second extremity being reached; and at least one elastic element configured to passively move back both the first extremity and the second extremity to the rest position, wherein the bracket includes a shock absorber attached to the rest portion of the bracket, and wherein the shock absorber is cooperating with the handle when the second extremity is moved from the rest position to the activation position by smoothening a movement of the handle towards the activation position, and when the first extremity and the second extremity are moved together from the deployed position to the rest position by providing a soft stop for the handle when the handle returns to the rest position, wherein the handle defines an internal grasping area that includes an internal side facing the rest portion of the bracket in the deployed position, the internal side being configured to cooperate with the rest portion at least when the second extremity is moving from the rest position toward the activation position, and the shock absorber protruding from the rest portion.

2. The vehicle door handle assembly according to claim 1, wherein the shock absorber comprises an axle having two ends configured to cooperate with corresponding bearings of the rest portion, the corresponding bearings being cavities defined within the rest portion and the corresponding bearings being configured to receive the two ends of the axle, the cavities being configured to removably clip the two ends.

3. The vehicle door handle assembly according to claim 1, wherein the rest portion comprises:

two transverse fractions; and an angled fraction joining the two transverse fractions of the rest portion, wherein the shock absorber is provided in or attached to the angled fraction of the rest portion.

4. The vehicle door handle assembly according to claim 1, wherein the second extremity of the handle is configured to be pushed into the bracket for being displaced from the rest position to the activation position, the internal side being configured to rotate taking support on the shock absorber when moving from the rest position to the activation position.

5. The vehicle door handle assembly according to claim 1, wherein the internal side of the handle rests on the rest portion of the bracket when the first extremity and the second extremity are both in the rest position, the internal side of the handle also resting on the shock absorber.

6. The vehicle door handle assembly according to claim 1, wherein the handle is configured to be pushed in a rectilinear manner into the bracket, both the first extremity and the second extremity moving together from the rest position to the activation position.

7. The vehicle door handle assembly according to claim 6, wherein the handle is configured to abut on the rest portion of the bracket in the activation position, the handle being distant from the rest portion when the first extremity and the second extremity are both in the rest position.

8. The vehicle door handle assembly according to claim 1, wherein the rest portion comprises a receiving part, and wherein the shock absorber comprises:

a fixing part configured to be mounted on the receiving part of the rest portion; and a damping part configured to cooperate with the handle.

9. The vehicle door handle assembly according to claim 8, wherein the damping part is made of a resilient material.

10. The vehicle door handle assembly according to claim 8, wherein the fixing part is an axle provided with two ends configured to cooperate with corresponding bearings of the rest portion.

* * * * *